United States Patent
Asami et al.

(10) Patent No.: US 7,443,654 B2
(45) Date of Patent: Oct. 28, 2008

(54) SURFACE-MOUNTING CAPACITOR (75) Inventors: Tadamasa Asami, Toyama (JP); Toshihisa Nagasawa, Toyama (JP); Kenji Araki, Toyama (JP); Akihiro Kawai, Toyama (JP); Yuichi Maruko, Toyama (JP)

(73) Assignees: NEC TOKIN Corporation, Sendai-shi (JP); NEC TOKIN Toyama, Ltd., Toyama (JP)

( * ) Notice: Subject to any disclaimer, the term of this patent is extended or adjusted under 35 U.S.C. 154(b) by 50 days.

(21) Appl. No.: 11/199,839

(22) Filed: Aug. 9, 2005

(65) Prior Publication Data
US 2006/0044737 A1 Mar. 2, 2006

(30) Foreign Application Priority Data
Sep. 2, 2004 (JP) ............................. 2004-255333

(51) Int. Cl.
*H01G 9/00* (2006.01)
(52) U.S. Cl. ...................... 361/528; 361/523; 361/525; 361/529; 361/516; 361/519
(58) Field of Classification Search ......... 361/523–528, 361/529–534, 540, 508–519; 29/25.03, 25.01
See application file for complete search history.

(56) References Cited

U.S. PATENT DOCUMENTS

| | | | | |
|---|---|---|---|---|
| 4,571,662 A | * | 2/1986 | Conquest et al. | 361/306.1 |
| 5,067,048 A | * | 11/1991 | Schnabel | 361/540 |
| 6,262,878 B1 | * | 7/2001 | Shirashige et al. | 361/508 |
| 6,392,869 B2 | * | 5/2002 | Shiraishi et al. | 361/523 |
| 6,535,375 B1 | * | 3/2003 | Jung et al. | 361/523 |
| 6,678,149 B2 | * | 1/2004 | Matsumoto et al. | 361/523 |
| 6,680,841 B2 | * | 1/2004 | Tadanobu et al. | 361/523 |
| 6,882,518 B2 | * | 4/2005 | Tamura | 361/510 |
| 6,912,117 B2 | * | 6/2005 | Arai et al. | 361/523 |
| 6,975,503 B2 | * | 12/2005 | Abe et al. | 361/533 |
| 6,977,807 B2 | * | 12/2005 | Arai et al. | 361/523 |
| 6,989,982 B2 | * | 1/2006 | Kobayashi et al. | 361/523 |
| 7,135,754 B2 | * | 11/2006 | Sano et al. | 257/528 |
| 7,149,077 B2 | * | 12/2006 | Ishijima | 361/540 |

FOREIGN PATENT DOCUMENTS

| | | |
|---|---|---|
| JP | 2002-164760 A | 6/2002 |
| JP | 2002-313676 A | 10/2002 |
| JP | 2005-39040 A | 2/2005 |

* cited by examiner

*Primary Examiner*—Nguyen T Ha
(74) *Attorney, Agent, or Firm*—Frishauf, Holtz, Goodman & Chick, P.C.

(57) ABSTRACT

A surface-mounting thin type capacitor includes a capacitor element having a shape of ⊐ and two end portions which form a side surface of the capacitor element. Two anode terminals are disposed on lower surfaces of the end portions along the side surface to form a mounting surface substantially perpendicular to the side surface. A cathode terminal is disposed at a middle part of the capacitor element to form the mounting surface together with the anode terminals. The cathode terminal is not between the anode terminals spatially and thereby manufacturing process of the capacitor is simplified and it is easy to change the intended use of the capacitor.

7 Claims, 9 Drawing Sheets

SURFACE-MOUNTING CAPACITOR

This application claims priority to prior Japanese patent application JP 2004-255333, the disclosure of which is incorporated herein by reference.

BACKGROUND OF THE INVENTION

This invention relates to a surface-mounting capacitor, which is usable as a noise filter, a bypass capacitor or a decoupling capacitor on an electronic substrate.

Recently, with the improvements in performance, advances in miniaturization and/or weight reduction of electronic components mounted on an electronic substrate, a power supply is rapidly miniaturized. The miniaturization of the power supply is firstly achieved by increasing of the operating frequencies of the electronic components. The high operating frequencies of the electronic components cause a problem of electromagnetic interference in circuits on the electronic substrate. Accordingly, demands increasingly become severe regarding performance of a component, such as a noise filter, mounted on the electronic substrate. To meet the demands, a solid electrolytic capacitor has been developed which has conductive functional polymer film as a cathode and a valve effect metal layer, such as an aluminum or tantalum layer, as an anode, and has been in practical use as a surface-mounting thin type capacitor. Such a solid electrolytic capacitor is disclosed in Japanese Unexamined Patent Application Publications No. JP2002-313676 A (hereinafter referred to as Document 1), No. JP2002-164760 A (hereinafter referred to as Document 2), or No. JP2005-39040 A (hereinafter referred to as Document 3).

According to Document 1, a first conventional solid electrolytic capacitor has a first metal plate. The first metal plate has oxide films on both faces thereof and a pair of anode portions at both ends thereof. The first metal plate is sandwiched by flat cathode members of functional polymer to expose the anode portions. The cathode members are covered with second metal plates at opposite sides of the first metal plate. The anode portions are connected to anode terminals while one of the second metal plates is connected to a cathode terminal. The other of the second metal plates projects from ends of the cathode members over the anode portions. With this structure, the noise reduction performance of the first conventional capacitor is improved at high frequency range over 100 MHz.

Document 2 discloses a second conventional solid electrolytic capacitor having a distribution constant circuit portion. The second conventional capacitor is similar to the first conventional capacitor except that it has a metal layer instead of the second metal plates to form the distribution constant circuit portion. The metal layer covers the flat cathode members and the part of the first metal plate sandwiched by the flat cathode members. With this structure, the second conventional capacitor can reduce noise over a wide band.

Document 3 discloses a third conventional solid electrolytic capacitor having a main element similar to the first conventional capacitor except that the second metal plates are substantially the same size. The third conventional capacitor further has reinforcing metal plates and thermosetting adhesive impregnated tapes for fixing the reinforcing metal plates to the main element. The reinforcing metal plates have steps to reduce intervals between edges thereof. The steps prevent oxygen from penetrating to the main element and thereby the third conventional capacitor has high reliability and high heat resistance.

At any rate, the conventional capacitors have the two anode portions each. The anode portions are located at both sides of the cathode member(s). Accordingly, the anode terminals connected to the anode portions are located at both sides of the cathode terminal connected to the cathode member. To use the conventional capacitor as a two terminal type capacitor, the anode terminals must be electrically connected to each other. Generally, a connecting wire (or pattern) to connect the anode terminals each other is formed on the electronic substrate on which the capacitor is mounted. The connecting wire is so arranged to avoid a land for the cathode terminal that a land pattern including the land and the connecting wire is larger than that of a three terminal type capacitor. Therefore, the conventional capacitors mentioned above have a common problem that different land patterns having different occupying areas are necessary in accordance with intended use. That is, the size of a mounting area for mounting each conventional capacitor on the electronic substrate must be varied according to the intended use of the capacitor.

In addition, there is a problem that masking process and removing process are necessary to mask the anode portions by mask layers and to remove the mask layers in a manufacturing process for each conventional capacitor. This is because the second metal plates (or a metal layer) are located between the anode portions.

SUMMARY OF THE INVENTION

It is therefore an object of this invention to provide a surface-mounting capacitor which it is unnecessary to vary the size of a mounting area on an electronic substrate regardless of intended use thereof.

Another object of this invention is to provide a surface-mounting capacitor capable of being manufactured by relatively simple process.

Other objects of this invention will become clear as the description proceeds.

According to an aspect of this invention, a surface-mounting capacitor comprises a capacitor element having an anode body made of a valve effect metal foil of which surface area is increased, and a conductive polymer as a solid electrolyte. A plurality of anode terminals is connected to the anode body to form a mounting surface substantially perpendicular to a side surface of the capacitor element. The anode terminals are disposed along the side surface of the capacitor element.

According to another aspect of this invention, a surface-mounting capacitor comprises a plurality of anode terminals arranged in line. A cathode terminal is arranged to form a mounting surface together with the anode terminals. The cathode terminal is out of line in relation to the anode terminals.

According to further still another aspect of this invention, a method for manufacturing a surface-mounting capacitor comprises the steps of preparing a semi-finished capacitor element having a plurality of end portions at a side thereof, and soaking the semi-finished capacitor element in a liquid or paste conductive material except for the end portions.

DESCRIPTION OF THE PREFERRED EMBODIMENTS

Referring to FIGS. 1 to 4, a description will be first directed to a surface-mounting capacitor illustrating common features of the capacitor products disclosed in Documents 1, 2 and 3.

Figure 1A:
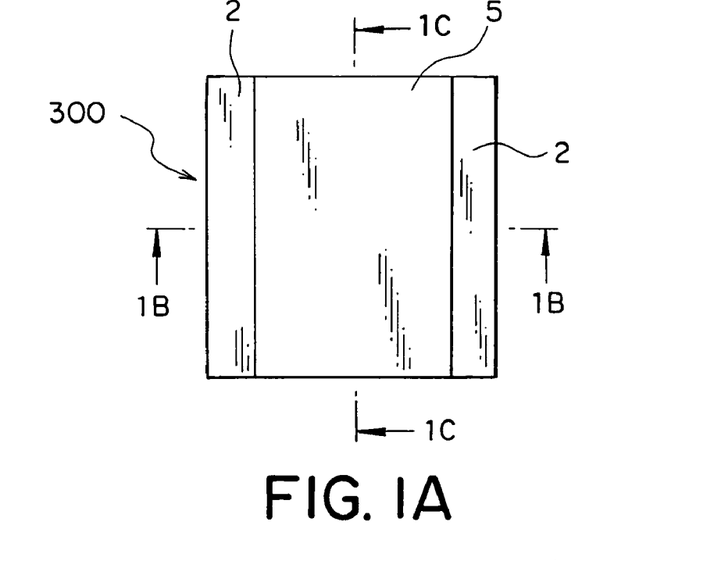
FIG. 1A is a plan view of a capacitor element used in a surface-mounting capacitor product illustrating common features of the capacitor products disclosed in Documents 1, 2 and 3.
Figure 1B:
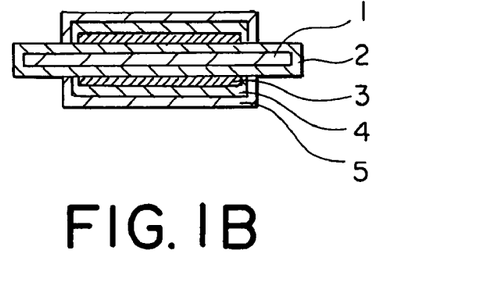
FIG. 1B is a sectional view taken along a dashed line 1B-1B of FIG. 1A.
Figure 1C:
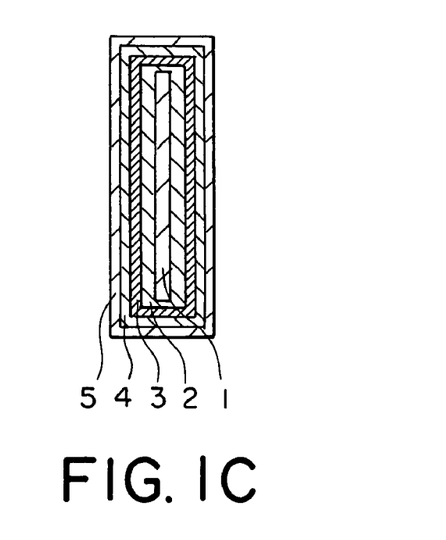
FIG. 1C is a sectional view taken along a dashed line 1C-1C of FIG. 1A.

FIGS. 1A-1C show a capacitor element usable for the surface-mounting capacitor. FIG. 1A is a schematic plan view of the capacitor element. FIG. 1B is a sectional view taken along a dashed line 1B-1B of FIG. 1A. FIG. 1C is a sectional view taken along a dashed line 1C-1C of FIG. 1A.

As illustrated in FIGS. 1A-1C, the capacitor element 300 has an anode body 1 covered with an oxide layer 2. A conductive polymer film 3, as a solid electrolyte layer, covers the oxide layer 2 except both end portions of the anode body 1. A graphite layer 4 and a silver layer 5 are overlaid on the conductive polymer film 3 in order.

Figure 2A:
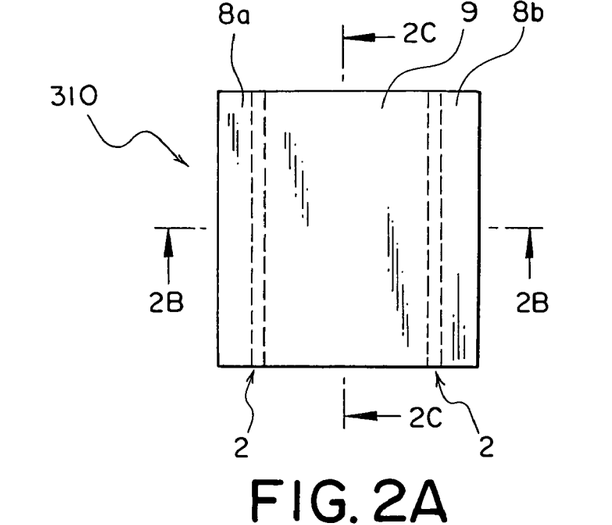
FIG. 2A is a plan view of the surface-mounting capacitor product including the capacitor element of FIGS. 1A-1C.
Figure 2B:
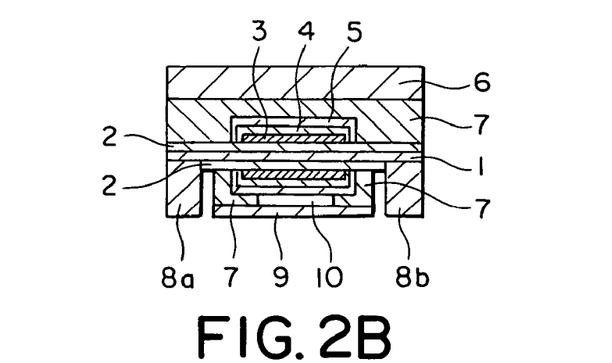
FIG. 2B is a sectional view taken along a dashed line 2B-2B of FIG. 2A.
Figure 2C:
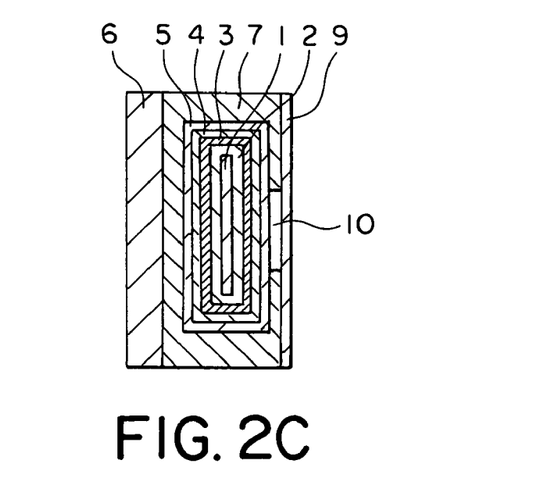
FIG. 2C is a sectional view taken along a dashed line 2C-2C of FIG. 2A.

FIGS. 2A-2C show a product of the surface-mounting capacitor including the capacitor element 300. FIG. 2A is a schematic plan view of the capacitor product 310. FIG. 2B is a sectional view taken along a dashed line 2B-2B of FIG. 2A. FIG. 2C is a sectional view taken along a dashed line 2C-2C of FIG. 2A.

The capacitor product 310 has a metal plate 6 which is adhered on an upper surface of the capacitor element 300 by a thermosetting adhesive impregnated tape 7. The oxide layer 2 is partly removed to form anode terminals 8a and 8b at both end portions of a lower surface of the anode body 1. A cathode terminal 9 is adhered on a lower surface of the capacitor element 300 by the adhesive silver layer 10 and the thermosetting adhesive impregnated tape 7. Thus, the anode terminals 8a and 8b and the cathode terminal 9 are disposed at a lower side to form a mounting surface of the capacitor product 310.

As understood from FIGS. 2A and 2B, the cathode terminal 9 is located between the anode terminals 8a and 8b. Accordingly, mask layers are necessary to form the conductive polymer film 3, graphite layer 4 and the silver layer 5 in a manufacturing process of the capacitor product 310.

A manufacturing process of the capacitor product 310 will be roughly described below.

Figure 3:
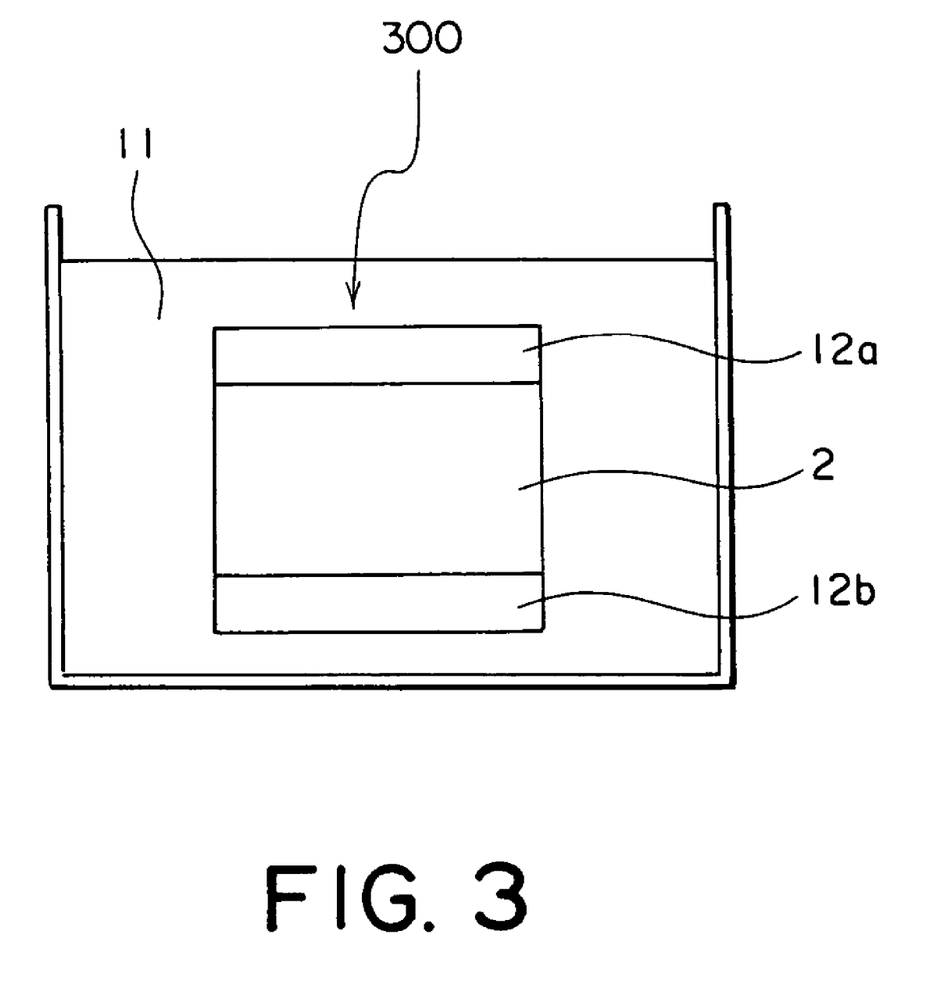
FIG. 3 is a schematic view for describing a conductive layer forming process for the capacitor element of FIGS. 1A-1C.

As illustrated in FIG. 3, the mask layers 12a and 12b are formed on the oxide film 2 to cover areas for the anode terminals 8a and 8b and expose an area for the cathode terminal 9. A semi-finished product of the capacitor element 300 with the mask layers 12a and 12b is soaked in a liquid or paste material to form the conductive polymer film 3, graphite layer 4 or the silver layer 5. Then, the mask layers 12a and 12b are removed to complete the capacitor element 300.

Next, the oxide film 2 is partly taken away at the areas for the anode terminal 8a and 8b while the anode terminal 8a and 8b are joined to the anode body 1 by means of ultrasonic welding. Then, the cathode terminal 9 is adhered to the lower surface of the silver layer 5 by the adhesive silver layer 10. Subsequently, the thermosetting adhesive impregnated tape 7 is disposed around the adhesive silver layer 10 and the silver layer 5. After the metal plate 6 is disposed on an upper side of the thermosetting adhesive impregnated tape 7, the metal plate 6 and the cathode terminal 9 are pressed at their both edge portions towards each other while the thermosetting adhesive impregnated tape 7 is cured by heating. Thus the capacitor element 300 is sealed and the capacitor product 310 is achieved.

Figure 4A:
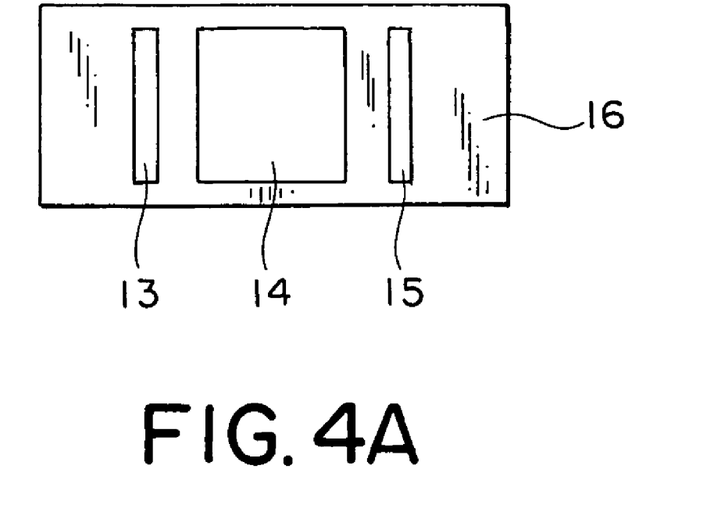
FIG. 4A is a plan view of a land pattern for use of the capacitor product of FIGS. 2A-2C as a three-terminal capacitor.

The capacitor product 310 can be used either as a two-terminal or three-terminal component depending upon how to connect both anode terminals. In a case where the capacitor product 310 serves as a three-terminal capacitor, it is usable as a noise filter to remove or suppress wideband noise with high precision. For this use, lands are formed on a substrate (e.g. a printed wiring board or a circuit board) to connect the capacitor product 310 to the circuit as shown in FIG. 4A. The anode terminals 8a and 8b are connected to lands 13 and 15 on the substrate 16 respectively while the cathode terminal 9 is connected to a land 14.

Figure 4B:
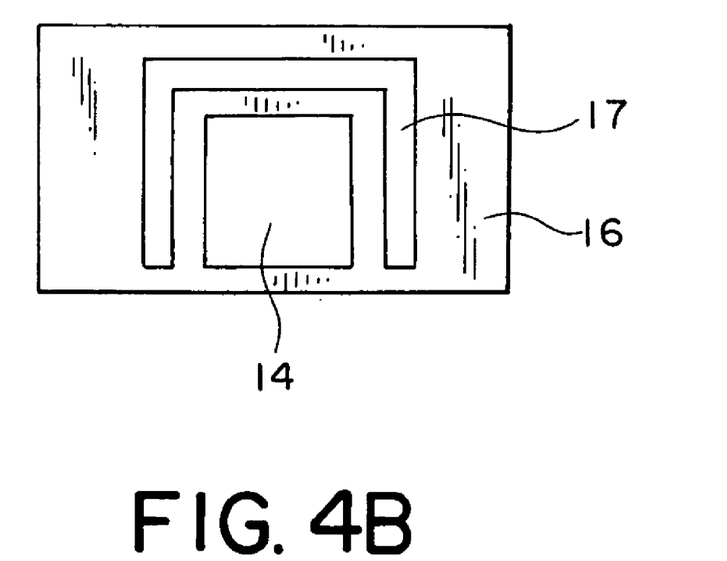
FIG. 4B is a plan view of a land pattern for use of the capacitor product of FIGS. 2A-2C as a two-terminal capacitor.

In a case where the capacitor product 310 serves as a two-terminal capacitor, it is generally used for a bypass capacitor or a decoupling capacitor. For this use, lands are arranged on a substrate as shown in FIG. 4B. The anode terminals 8a and 8b are connected to a land 17 in common while the cathode terminal 9 is connected to a land 14.

As easily understood from comparison between FIGS. 4A and 4B, a necessary area for mounting the capacitor product 310 on the substrate is different according to the propose for use. In other words, an area occupied by a land pattern for the capacitor product 310 is different according to the intended use of the capacitor product 310.

Referring to FIGS. 5 to 8, a description will be made of a surface-mounting thin type capacitor according to a first embodiment of this invention.

Figure 5A:
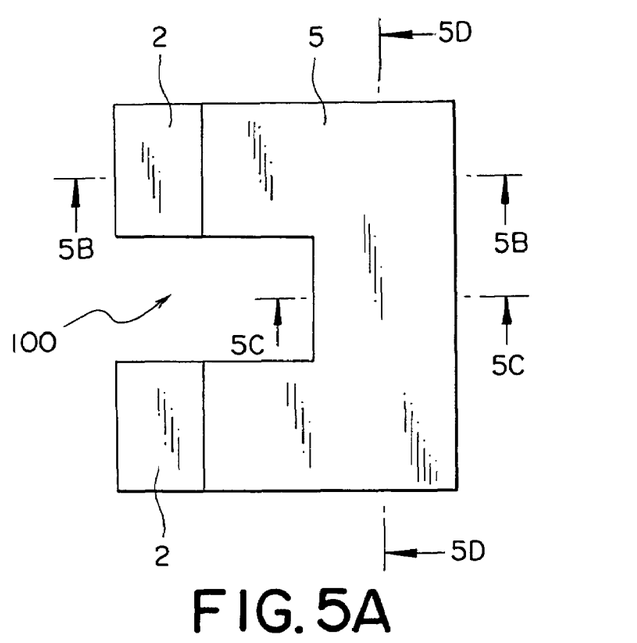
FIG. 5A is a plan view of a capacitor element used in a surface-mounting capacitor product according to a first embodiment of this invention.
Figure 5B:
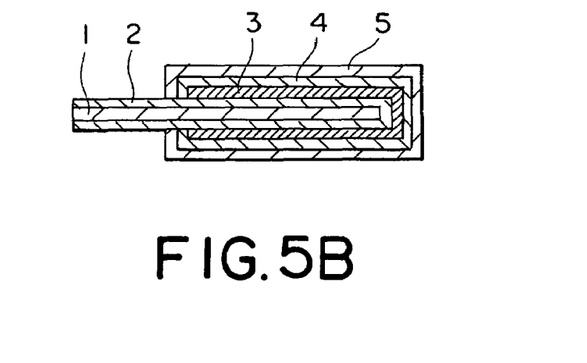
FIG. 5B is a sectional view taken along a dashed line 5B-5B of FIG. 5A.
Figure 5C:
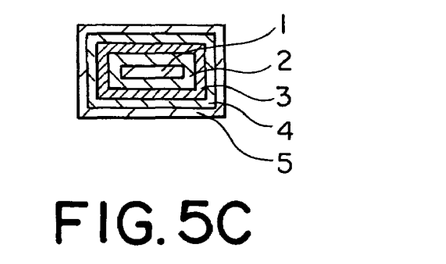
FIG. 5C is a sectional view taken along a dashed line 5C-5C of FIG. 5A.
Figure 5D:
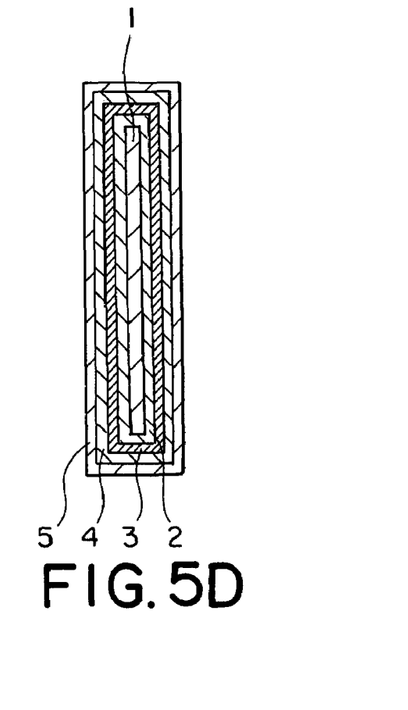
FIG. 5D is a sectional view taken along a dashed line 5D-5D of FIG. 5A.

FIGS. 5A-5D show a capacitor element usable for the surface-mounting thin type capacitor. FIG. 5A is a schematic plan view of the capacitor element. FIG. 5B is a sectional view taken along a dashed line 5B-5B of FIG. 5A. FIG. 5C is a sectional view taken along a dashed line 5C-5C of FIG. 5A. FIG. 5D is a sectional view taken along a dashed line 5D-5D of FIG. 5A.

The capacitor element 100 shown in FIGS. 5A-5D is similar to the element 300 except for the shape. As shown in FIG. 5A, the capacitor element 100 has a shape of ⊐ or horseshoe. End portions of the capacitor element 100 are projected in the same direction (i.e. a left-hand side of FIG. 5A) from a middle part. In other words, the end portions are formed at a side of the middle part to be parallel with each other. The end portions may not be parallel with each other on condition that they projects in a direction inclining from a predetermined direction (i.e. a left-hand direction of FIG. 5A) at smaller angle than 180°.

The both end portions of the capacitor element 100 are used for the anode terminals (8a and 8b in FIGS. 7A and 7B) while the middle part is used for the cathode terminal (9 in FIGS. 7A-7D). The anode terminals and the cathode terminal are formed on a lower surface of the capacitor element 100 as mentioned later. The faces of the both end portions are arranged in line at a left-hand side of FIG. 5A and form a side surface of the capacitor element 100. The middle part is apart from the side surface formed by the end portions.

The anode body 1 is made of a valve effect metal foil, such as an aluminum, tantalum or niobium foil. The valve effect metal foil is increased regarding the surface area thereof. For instance, etching is used to increase the surface area of the valve effect metal foil.

The oxide film 2 is formed through anodization of the anode body 1 in an appropriate electrolyte.

Figure 6:
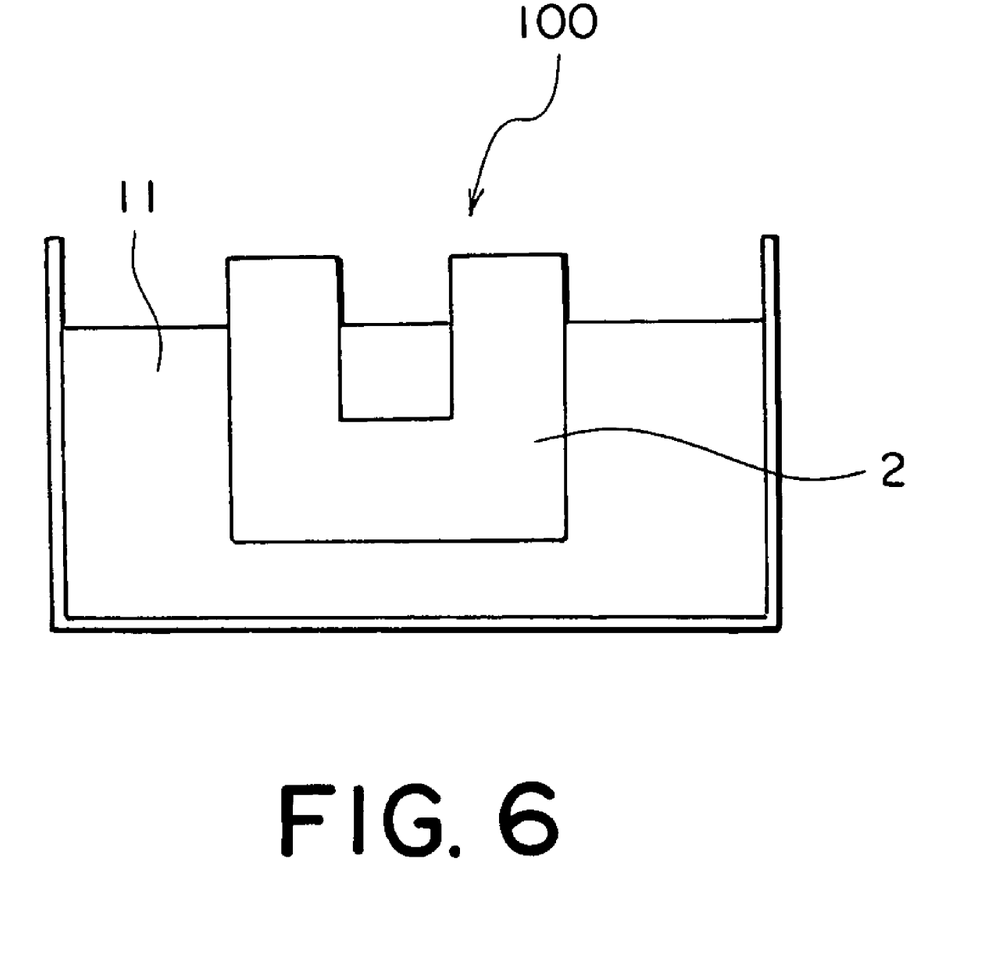
FIG. 6 is a schematic view for illustrating a conductive layer forming process for the capacitor element of FIGS. 5A-5C.

The conductive polymer film 3 made of polypyrrole, polythiophene, polyaniline or the like, the graphite layer 4 and the silver layer 5 are formed on the oxide film 2 in order except the end portions in a manner illustrated in FIG. 6. That is, the semi-finished product of the capacitor element 100 is soaked in the liquid or paste material 11 except for the end portions. Thus, no mask is necessary to form the conductive polymer film 3, the graphite layer 4 and the silver layer 5. In other words, the masking process for forming a mask and the removing process for removing the mask are unnecessary. Therefore, the manufacturing process is simplified and thereby production efficiency is improved.

Figure 7A:
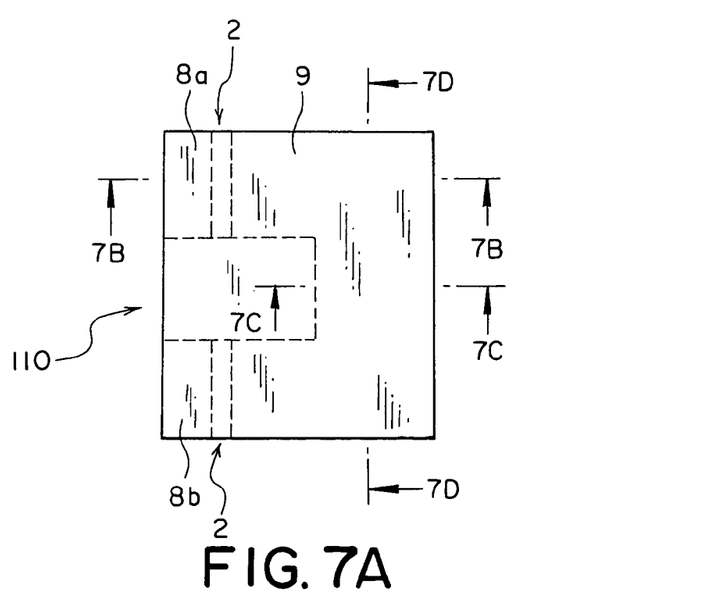
FIG. 7A is a plan view of the surface-mounting capacitor product using the capacitor element of FIGS. 5A-5D.
Figure 7B:
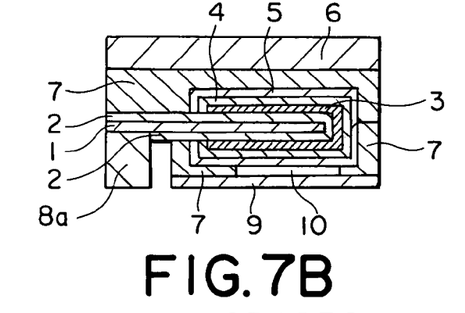
FIG. 7B is a sectional view taken along a dashed line 7B-7B of FIG. 7A.
Figure 7C:
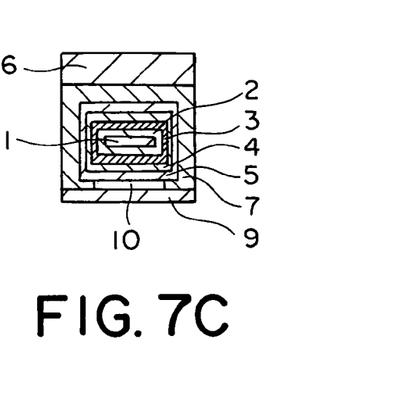
FIG. 7C is a sectional view taken along a dashed line 7C-7C of FIG. 7A.
Figure 7D:
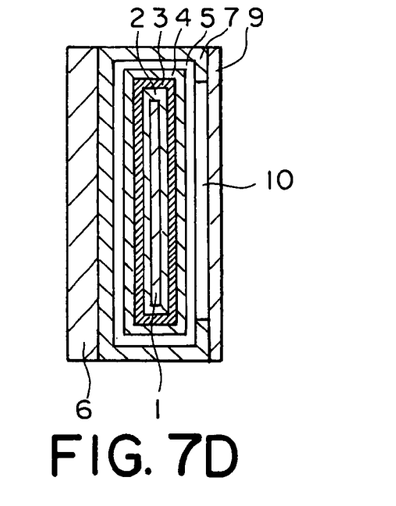
FIG. 7D is a sectional view taken along a dashed line 7D-7D of FIG. 7A.

FIGS. 7A-7D show a product 110 of the surface-mounting thin type capacitor using the capacitor element 100. FIG. 7A is a schematic plan view of the capacitor product 110. FIG. 7B is a sectional view taken along a dashed line 7B-7B of FIG. 5A. FIG. 7C is a sectional view taken along a dashed line 7C-7C of FIG. 7A. FIG. 7D is a sectional view taken along a dashed line 7D-7D of FIG. 7A.

The capacitor product 110 is manufactured like the capacitor product 310. Particularly, the oxide film 2 of the capacitor element 100 is partly removed at lower sides of the end portions while the anode terminal 8a and 8b are joined to the anode body 1 by means of ultrasonic welding. The anode terminals 8a and 8b are arranged along the side surface formed by the end portions of the capacitor element 100.

Next, the cathode terminal 9 is adhered to the lower surface of the silver layer 5 by the adhesive silver layer 10. The cathode terminal 9 forms a mounting surface of the capacitor product 110 together with the tops of the anode terminal 8a and 8b. The cathode terminal 9 is out of line in relation to the anode terminals 8a and 8b. The cathode terminal 9 is apart from the side surface of the capacitor element 100 and not between the anode terminals 8a and 8b.

After that, the thermosetting adhesive impregnated tape 7 is disposed around the adhesive silver layer 10 and the silver layer 5. Then, the metal plate 6 is disposed on the upper side of the thermosetting adhesive impregnated tape 7, and the metal plate 6 and the cathode terminal 9 are pressed at their both edge portions towards each other while the thermosetting adhesive impregnated tape 7 is cured by heating. Thus, the capacitor element 100 is sealed to produce the capacitor product 110.

Figure 8A:
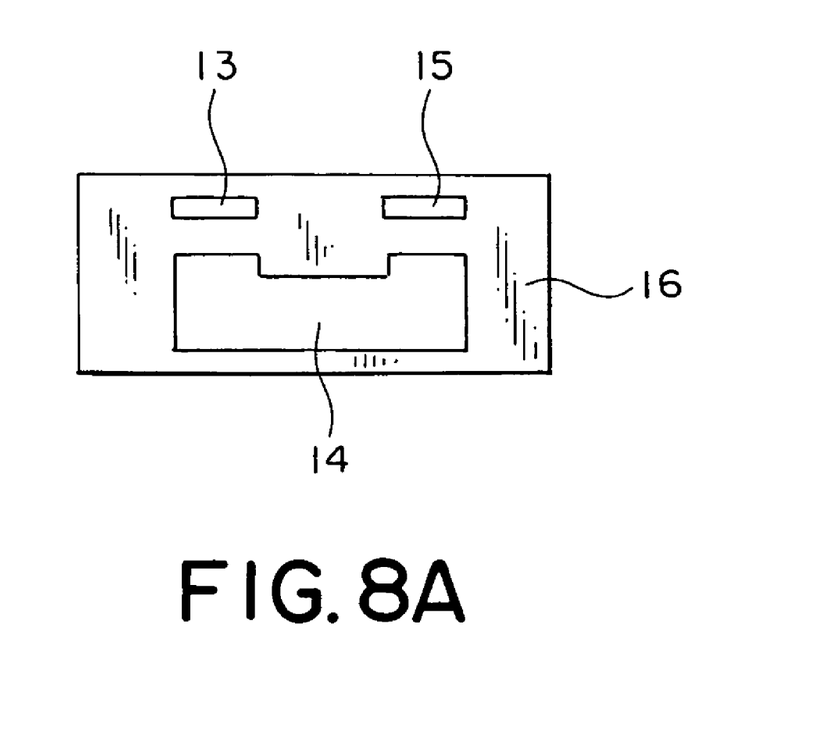
FIG. 8A is a plan view of a land pattern for use of the capacitor product of FIGS. 7A-7D as a three-terminal capacitor.
Figure 8B:
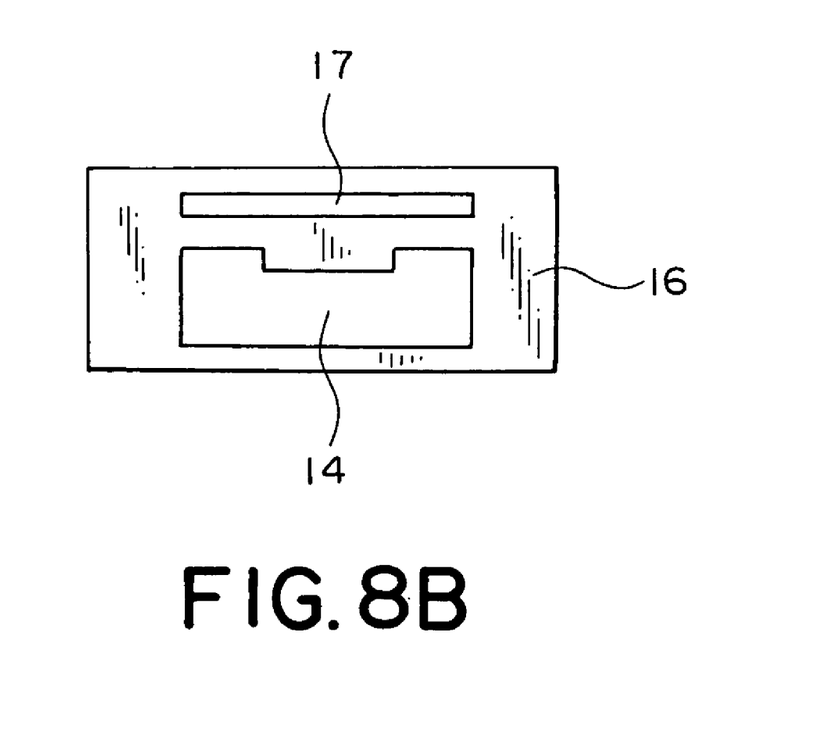
FIG. 8B is a plan view of a land pattern for use of the capacitor product of FIGS. 7A-7D as a two-terminal capacitor.

The capacitor product 110 can be used as a two-terminal capacitor or a three-terminal capacitor similarly as for the capacitor 310. FIG. 8A shows a land pattern to use the capacitor product 110 as the three-terminal capacitor. The land pattern of FIG. 8A includes the lands 13-15 formed on the substrate 16. The lands 13 and 15 are connected to the anode terminals 8a and 8b respectively. The land 14 is connected to the cathode terminal 9. On the other hand, FIG. 8B shows a land pattern for use of the capacitor product 110 as the two-terminal capacitor formed on the substrate 16. The land pattern includes the land 14 and 17. The land 14 is connected to the cathode terminal 9. The land 17 is connected to both of the anode terminals in common.

As understood from comparison between FIGS. 8A and 8B, these land patterns occupy areas of the same size. Accordingly, a mounting area for mounting the capacitor product 110 on the electrical substrate 16 is fixed in size regardless of the intended use of the capacitor product 110. Therefore, it is unnecessary to vary the size of the mounting area in accordance with the intended use of the capacitor product 110.

Referring to FIGS. 9A-9D, a second embodiment of this invention will be describes in the following.

Figure 9A:
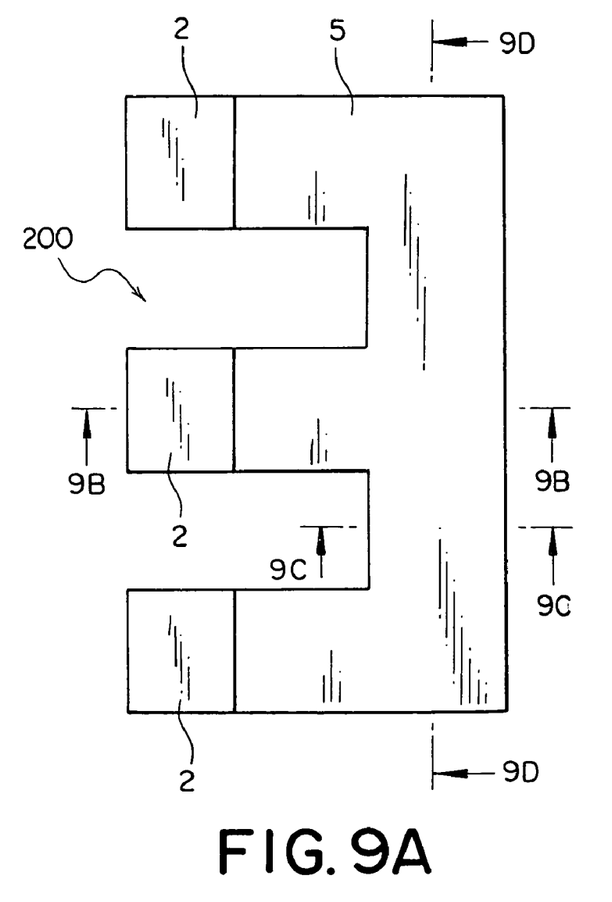
FIG. 9A is a plan view of a capacitor element used in a surface-mounting capacitor product according to a second embodiment of this invention.
Figure 9B:
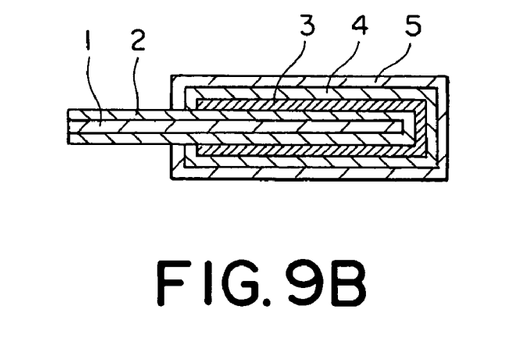
FIG. 9B is a sectional view taken along a dashed line 9B-9B of FIG. 9A.
Figure 9C:
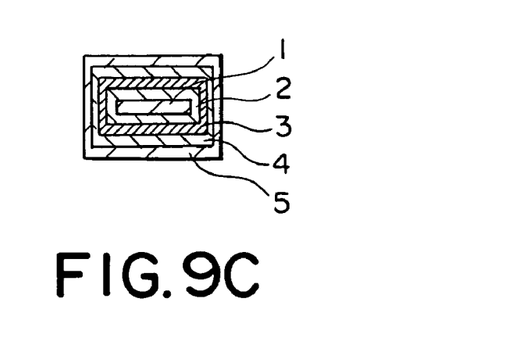
FIG. 9C is a sectional view taken along a dashed line 9C-9C of FIG. 9A.
Figure 9D:
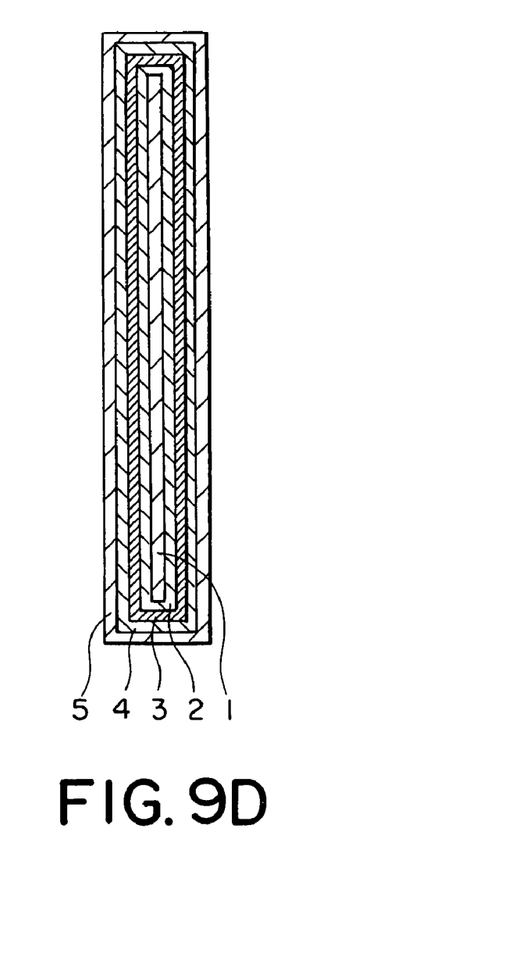
FIG. 9D is a sectional view taken along a dashed line 9D-9D of FIG. 9A.

FIGS. 9A-9D show a capacitor element 200 of the second embodiment. FIG. 9A is a schematic plan view of the capacitor element 200. FIG. 9B is a sectional view taken along a dashed line 9B-9B of FIG. 9A. FIG. 9C is a sectional view taken along a dashed line 9C-9C of FIG. 9A. FIG. 9D is a sectional view taken along a dashed line 9D-9D of FIG. 9A.

The capacitor element 200 differs from the capacitor element 100 in that it has an E shape and three anode portions. The three anode portions are end portions of crossbars of the capacitor element 200. The capacitor element 200 is used to manufacture a capacitor product (not shown) similarly as for the capacitor element 100.

While this invention has thus far been described in conjunction with the preferred embodiments thereof, it will readily be possible for those skilled in the art to put this invention into practice in various other manners.

For example, though the ⊐-shaped capacitor element and the E-shaped capacitor element are mentioned above, other shapes, such as C shape, U shape, V shape, W shape or the like, may be used for the capacitor element. Alternatively, a comb-shaped capacitor element, which has four or more end portions for anode terminals, may be used for the capacitor element. At any rate, a plurality of end portions of a capacitor element is formed at a side of a middle portion of the capacitor element and they severe from each other.

In addition, a molded resin, a metal pipe case or a resin case may be adopted as an external packaging of the capacitor product.

What is claimed is:

1. A surface-mounting capacitor comprising:
    a capacitor element including: (i) an anode body which is made of a valve effect metal foil of which a surface area is increased, and which comprises end portions that are separate from each other and project from a middle part of the anode body toward a same direction, and (ii) a conductive polymer as a solid electrolyte; and
    a plurality of anode terminals which are connected to the end portions of said anode body, respectively, to form a mounting surface that is substantially perpendicular to a side surface of said capacitor element;
    wherein said anode terminals are disposed along said side surface of said capacitor element.

2. A surface-mounting capacitor as claimed in claim 1, wherein said plurality of anode terminals consists of two anode terminals, and said capacitor element has one of a ⊐shape, a U shape and a V shape.

3. A surface-mounting capacitor as claimed in claim 1, wherein said plurality of anode terminals consists of three anode terminals, and said capacitor element has one of an E shape and a W shape.

4. A surface-mounting capacitor as claimed in claim 1, wherein said plurality of anode terminals comprises at least four anode terminals, and said capacitor element has a comb shape.

5. A surface-mounting capacitor as claimed in claim 1, wherein the plurality of the end portions are parallel to each other.

6. A surface-mounting capacitor comprising:
    a capacitor element which includes an anode body;
    a plurality of anode terminals connected to end portions of said anode body, respectively, and arranged in line with each other, wherein said end portions project from a middle part of said anode body in one direction and are separated from each other; and
    a cathode terminal which, together with the anode terminals, forms a mounting surface;
    wherein said cathode terminal is not in line with said anode terminals.

7. A method for manufacturing a surface-mounting capacitor, comprising:
    preparing a semi-finished capacitor element which includes an anode body with a plurality of end portions at one side thereof; and
    soaking said semi-finished capacitor element, except for said end portions, in a liquid or paste conductive material.

* * * * *